Aug. 12, 1969   E. N. KAUFMAN   3,461,416
PRESSURE TRANSDUCER UTILIZING SEMICONDUCTOR BEAM
Filed Dec. 4, 1967   2 Sheets-Sheet 2

INVENTOR.
EDWIN N. KAUFMAN
BY
*George C. Sullivan*
Agent

United States Patent Office 3,461,416
Patented Aug. 12, 1969

3,461,416
PRESSURE TRANSDUCER UTILIZING SEMICONDUCTOR BEAM
Edwin N. Kaufman, Woodland Hills, Calif., assignor to Lockheed Aircraft Corporation, Burbank, Calif.
Filed Dec. 4, 1967, Ser. No. 687,757
Int. Cl. G01l 1/22
U.S. Cl. 338—4          10 Claims

ABSTRACT OF THE DISCLOSURE

A miniaturized pressure transducer is described having a high output, linear DC signal derived from a semiconductor sensing element. The pressure-responsive diaphragm is readily interchangeable to accommodate various ranges of input pressure. The low mass of the notched-beam semiconductor sensor and the elements related thereto result in an unusually steep rise time of the transducer's output in response to a step function pressure input.

Background of the invention

Many pressure transducers of the prior art consist of an electrical sensor element such as a resistor, capacitor, or inductance whose value is made to vary with an applied input pressure. These devices have been satisfactory for those applications in which the input pressure is above a given minimum and its rate of change is below a given maximum. The need exists, however, to accurately measure very low pressure levels at high rates of change. Pressure transducers to achieve these objectives have heretofore been characterized by a number of shortcomings. In order to provide excellent dynamic response it is necessary to maintain the mass of the system as low as possible. Attempts heretofore to reduce the mass imposed serious limitations on the ability of the device to generate an output signal of adequate magnitude. That is, any reduction in size has been attended by a corresponding reduction in electrical output. This shortcoming of prior devices has been overcome by the present invention which, while reducing the mass of the dynamic elements, does not result in an attendant reduction in sensitivity or output.

Summary of the invention

The present invention comprises a miniature pressure transducer having a thin pressure-responsive diaphragm which is mechanically coupled to the free end of a notched cantilevered beam carrying a semiconductor element. The very small size of the sensitive area of the diaphragm permits point source pressures to be measured. The mechanical coupling between the diaphragm and the semiconductor element is separable, thus permitting easy interchange of diaphragms. The semiconductor element comprises a chip of silicon semiconductor material supported across the notch of the cantilever, and arranged so that the resistance of the element is varied by the application of a strain to the region of the notch. The free end of the cantilever is mechanically coupled to the center of a clamped-edge circular diaphragm by means of a drive pin. Thus, deflection of the diaphragm will apply a bending moment to the cantilever. The resistance of the semiconductor element, supported across the notch in the cantilever, varies directly and linearly with the deflection of the diaphragm. The element is excited by direct current so that the resistance variations are translated into voltage or current variations. Frequency response extends from DC to an upper limit which is dependent upon the mechanical-acoustical properties of the diaphragm and its linkage to the semiconductor element.

The supporting structure for the diaphragm and sensing element comprises a cylindrical case having its diaphragm substantially flush with one end thereof. This configuration of the case is such as to greatly facilitate the assembly of the transducer with a minimum of tools or special fixtures. Also, the construction permits the diaphragm to be readily replaced should this be desired.

It is therefore an object of the invention to provide a novel and improved pressure transducer having a linear, high-level output over a very wide frequency range.

Another object of the invention is to provide a novel and improved pressure transducer employing a sensor for measuring very low pressures.

It is another object of the invention to provide a novel and improved pressure transducer employing a semiconductor sensing element and which is capable of unusually wide dynamic response.

It is still another object of the invention to provide a novel and improved pressure transducer having readily replaceable pressure-responsive diaphragms.

Yet another object of the invention is to provide a novel and improved pressure transducer employing a cantilevered semiconductor sensor coupled directly to a pressure sensing diaphragm for measuring fluid pressures with superior accuracy, linearity and frequency response.

Still another object of the invention is to provide a novel and improved pressure sensing transducer capable of providing performance superior to previous devices heretofore intended to accomplish generally similar results.

These and other objects of the invention will become apparent on consideration of the following specification and drawings.

Description of the preferred embodiment

Figure 1:
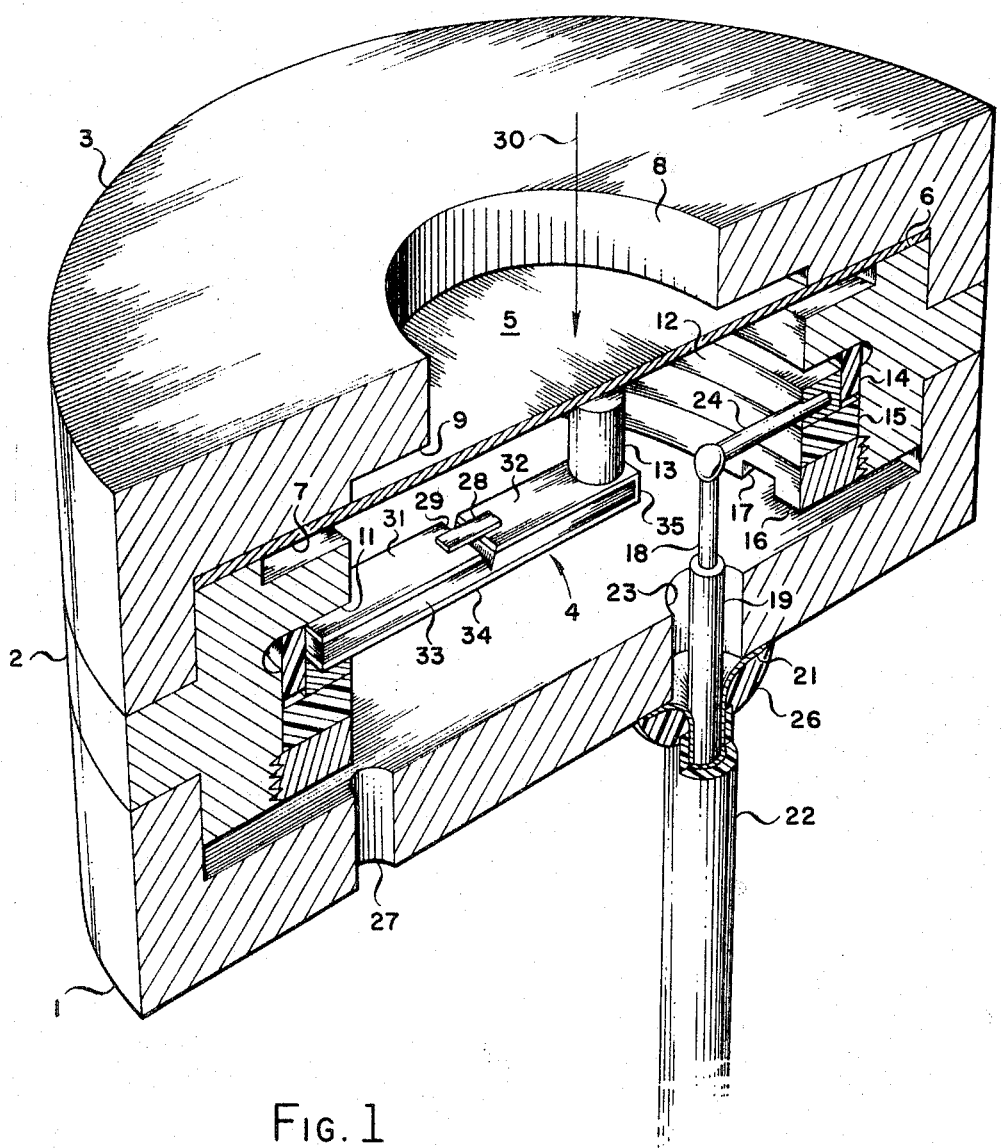
FIGURE 1 is a greatly enlarged perspective view of a preferred embodiment of the invention, sectioned diametrally along the cylindrical axis.

The preferred transducer embodiment illustrated in FIGURE 1 is enclosed in a three-piece case comprising cap 1, body 2, and cover 3, each of which may be fabricated from a suitable metal such as brass. The three-piece case is shown in half-section in FIGURE 1, it being understood that the portion not shown is symmetrical about the cylindrical axis. For clarity, certain other components (e.g., 4, 13, and 18) have not been shown in cross section. A thin pressure responsive diaphragm 5 is supported at its periphery between body 2 and cover 3. The material from which diaphragm 5 is fabricated will depend upon the intended application and may, for example, comprise stainless steel for high-pressure applications or "Mylar" polyester film for low-pressure applications. Body 2 is provided with an annular lip portion 6 which bears against the underside of diaphragm 5 near its periphery in order to clamp the edge of diaphragm 5 against the lower surface of lip portion 7 on the underside of cover 3. Cover 3 is provided with a central entrance aperture 8 and a relieved area 9 through which the input fluid pressure is admitted to act upon the upper surface of diaphragm 5. As will be apparent to those versed in the art, cover 3 may be provided with a standard tubing fitting for connection to the fluid pressure source to be measured. This structure results in a clamped-edge diaphragm. The diaphragm 5 may, for example, be made of Monel and may be approximately 1 mil thick. Fabrication of a 1 mil thick metal diaphragm, without deforming the edge, may be accomplished by the well-known photoforming process.

The sensing element indicated generally at 4 is cantilevered between flange 11 of body 2, and contact ring 12. Ring 12, which carries the output signal, is preferably fabricated from a highly conductive metal such as brass. The unsupported end of sensing element 4 carries drive pin 13. The drive pin 13 is shown as a right cylinder in FIGURE 1, however it may be of any suitable cross section and serves to mechanically couple the center of diaphragm 5 to the unsupported end of element 4. Drive pin 13 is preferably fabricated from a rigid lightweight material such as methyl methacrylate. The lower end of pin 13 (as viewed in FIGURE 1) is cemented to sensing element 4 by any suitable bonding agent or adhesive compatible with the materials from which the respective elements are fabricated. An epoxy adhesive has been found to be highly suitable for this application. The upper end of pin 13 is urged against diaphragm 5, but is not bonded thereto. The force exerted by pin 13 against diaphragm 5 will be determined by the intended application and will be discussed more fully hereinafter.

Insulator ring 14 electrically isolates the return signal path of the sensing element 4 from body 2. This ring may be fabricated from "Teflon" polytetrafluoroethylene or other suitable dielectric material. Spacer ring 15 serves to insulate contact ring 12 from the body 2, and may be fabricated from "nylon" polyamide or other suitable dielectric material. Spacer ring 15 is urged against contact ring 12 by threaded lock ring 16. Lock ring 16 is threadedly secured to mating threads in body 2, and is provided with diametral slots, one of which is shown at 17, to receive a spanner.

A shielded cable 22 comprising inner conductor 18, insulating sheath 19, outer shield conductor 21, and insulating jacket 22, connects the transducer to the measuring bridge circuit. Although a shielded cable is shown in FIGURE 1, it should be understood that in many applications it would be unnecessary to shield the output leads due to the low impedance and relatively high level of the output signal. It has been found that type RG 174/U cable is well suited for most applications of the invention. The inner conductor 18 and its sheath 19 extend through aperture 23 into cap 1. Conductor 24 electrically connects contact ring 12 with inner conductor 18. Shield conductor 21 is electrically connected to cap 1. The insulating jacket 22 may be secured to cap 1 by means of an epoxy bond 26.

Cap 1 is provided with relief aperture 27 to vent the interior of the case to the atmosphere. In a typical construction, the case may be 0.5 inch in diameter and 0.25 inch thick.

The sensing element 4 comprises an elongated semiconductor chip 28 which bridges notch 29 and the ends of which are secured to respective ones of conductor films 31 and 32. Conductor films 31 and 32 are deposited on insulating substrate 33. Film 32 is electrically connected to deposited film 34 by an interconnecting film 35 extending over the free end of the beam comprising the sensing element 4. Thus, one end of chip 28 is electrically coupled to flange 11 via film 31 and the other end of chip 28 is electrically coupled to contact ring 12 via films 32, 35, and 34.

Chip 28 may, for example, be comprised of boron-doped p-type silicon. The resistance of the material changes in proportion to the applied strain and an output voltage proportional to the applied force on the beam (4) is produced from an ancillary bridge circuit. It should be noted that the silicon piezoresistive material (28) is not a semiconductor junction. It is known that semiconductor materials exhibit a pronounced piezoresistive effect and semiconductor crystals of certain crystallographic orientation provide extremely sensitive sensors. For example, p-type silicon has a gauge factor along the [111] direction of over 150, thus indicating an increase in sensitivity of up to 75:1 over ordinary materials. n-Type silicon has a similar gauge factor along the [100] direction. In a typical construction, chip 28 measures about 1/32 inch wide by 3/32 inch long by 0.005 inch thick. This arrangement will result in an elongation of chip 28 in response to a downwardly directed bending moment of the cantilevered sensing element 4. Changes in length of the semiconductor chip 28 will result in a corresponding change in electrical resistance. This principal is similar to that of the well-known electrical strain gage except that the sensitivity is several orders of magnitude higher. Furthermore, the mechanical compliance of this construction is extremely high. The impedance of a typical device is approximately 1200 ohms.

Mechanical assembly of the transducer is accomplished as follows:

The end of the shielded cable assembly is inserted through aperture 23 and the outer conductor 21 is soldered to cap 1. Jacket 22 is bonded to the exterior of cap 1 with epoxy 26. Conductor 24 is soldered to contact ring 12. Insulator ring 14 is placed into position adjacent flange 11. The end of sensing element 4 is placed in juxtaposition to flange 11. Contact ring 12, with conductor 24 attached, is placed in position between the bottom surface (34) of sensing element 4 and the interior wall of insulator ring 14. Spacer ring 15 is then urged against contact ring 12. Lock ring 16 is then threadedly mated with body 2 and rotated until it applies an adequate clamping force against spacer ring 15. Drive pin 13 is cemented to sensing element 4 so as to be axially centered. Cap 1 is then pressed onto body 2. Inner conductor 18 is soldered to conductor 24. Diaphragm 5 is placed in abutment with lip 7 of cover 3. Cover 3 is then pressed onto body 2. In certain applications, cover 3 may be omitted and replaced with the surrounding structure of the test specimen so as to provide a flush-mounted diaphragm. An example of such application is in wind-tunnel testing of aerodynamic models in which it is desired to imbed the pressure transducer in the model so as to place the pressure-responsive diaphragm in substantially the same plane as the exposed skin of the model.

Interchanging diaphragms to accommodate various pressure ranges may be readily accomplished by merely separating the friction-fit cover 3 from body 2 in order to gain access to the diaphragm 5.

The pressure transducer functions as follows:

The application of a fluid pressure to the diaphragm 5 will cause it to be deflected in the direction of arrow 35. Diaphragm 5 comprises a force summing element, the deflection of which is tranmitted to the free end of the sensing element 4 through drive pin 13. This will result in a strain being applied to semiconductor chip 28 tending to elongate it. The strain applied to chip 28 will result in a change to its electrical resistance and such change is used to modulate an excitation voltage to provide an output signal. If desired, the sensing element may be inverted so that a deflection in the direction of arrow 35 will compress chip 28 and thereby change its resistance. Since electrical energy is obtained from an external source, the power output of the transducer is not limited by the mechanical energy put into the system as in conventional piezoelectric and magnetic transducers.

Figure 2:
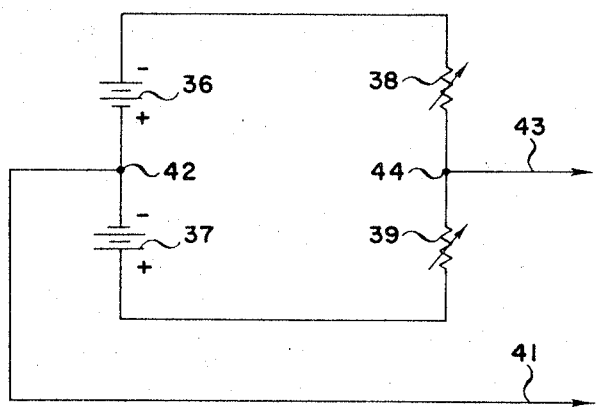
FIGURE 2 is a schematic circuit diagram illustrating the inclusion of the transducer of the invention in a half-bridge measuring circuit.

There is shown in FIGURE 2 a schematic diagram of a half-bridge circuit incorporating the above-described transducer. This circuit comprises first and second sources of DC voltage 36 and 37, respectively. The negative terminal of voltage source 36 is connected to semiconductor element 38. The positive terminal of voltage source 37 is connected to semiconductor element 39. Output terminal 41 is connected to the junction 42 between the positive terminal of source 36 and negative terminal of source 37. The remaining output terminal 43 is connected to junction 44 between semi-conductor elements 38 and 39. Element 38 comprises the active element of the bridge and is contained within the pressure transducer described above in connection with FIGURE 1. That is, element 38 corresponds to chip 28 of FIGURE 1. Semiconductor element 39 is an inactive sensing element having electrical properties substantially identical to those of the pressure transducer except that it is not mechanically coupled to a pressure diaphragm. This inactive sensing element (39) is incorporated in the bridge circuit for the purpose of cancelling undesirable temperature and acceleration effects. To accomplish this, element 39 should be located in close proximity to active element 38 and should be similarly oriented so as to be exposed to the same thermal and acceleration effects of the transducer's environment. The output signal appearing across terminals 41 and 43 comprises a voltage corresponding to the change in resistance of element 38 attributed solely to deflection thereof by an input pressure to the transducer. Changes in the resistance of inactive element 39 arising from environmental parameters other than pressure input to the transducer will produce a voltage which opposes the voltage produced by element 39 in response to environmental changes. Thus, a fully compensated transducer circuit is provided.

Figure 3:
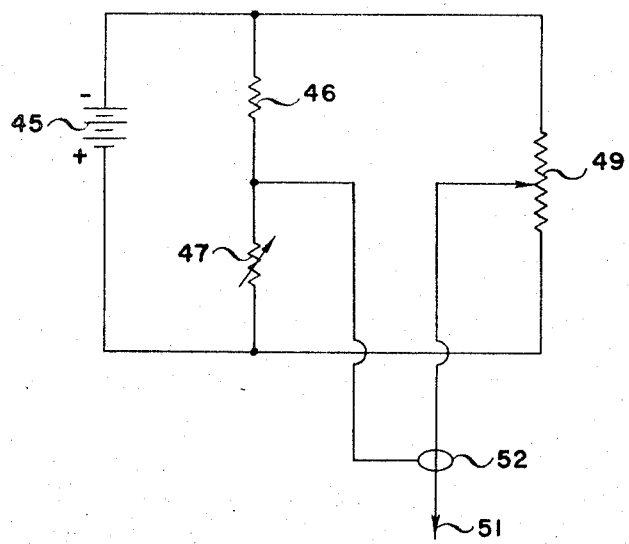
FIGURE 3 is a schematic circuit diagram illustrating the inclusion of the transducer of the invention in a full-bridge measuring circuit.

There is shown in FIGURE 3 an alternative bridge circuit incorporating a "zero adjust" control, and which does not include temperature and acceleration compensation. This configuration comprises a full-bridge circuit, as opposed ot the half-bridge circuit of FIGURE 2 and is preferred where the environmental parameters of acceleration and temperature do not impose serious problems. This circuit comprises DC power source 45, the negative terminal of which connects to bridge arm resistor 46 and to one end of zero adjust control 49. The positive terminal of power source 45 connects to the junction between the o.her end of zero adjust control 49 and sensing element 47. The output signal appears between the arm of control 49 and ground terminal 52. Control 49 may be adjusted to give zero DC output with zero input pressure.

In a typical construction an input pressure of 0.1 mm. of mercury may provide a full-scale output. In order to change the pressure range it is merely necessary to change the diaphragm. For low pressure ranges (e.g., 0.1 mm. Hg or 0.019 p.s.i. full-scale) a metalized polyester film diaphragm, 3 mils thick, is preferred. For higher pressures (e.g., to 60 mm. Hg full-scale) an Inconel diaphragm, 1 mil thick, has been found to be satisfactory. For still higher ranges (e.g., to 100 mm. Hg full-scale) an Invar diaphragm of appropriate thickness (e.g., 1 mil) has been successfully used. The output signal may be of the order of 5 to 30 millivolts per millimeter of mercury pressure depending on the diaphragm selected and the excitation voltage (e.g., 0.25–1.5 volts/p.s.i.).

The length of the drive pin 13 is determined by the intended operating parameters. In those applications requiring a high-pressure Invar diaphragm, it is preferred that the drive pin 13 be of such a length that upon assembly of the transducer, the engagement of pin 13 with diaphragm 5 will cause a small increase in the resistance of chip 28. This may be of the order of $$\Delta R = 25\text{–}75\Omega.$$

For lower pressure ranges and with more highly compliant diaphragms, there should be either no static force exerted by the diaphragm 5 on pin 13, or there should be a definite clearance therebetween. If the drive pin is too long the sensitivity tends to be degraded, and if too short there is a tendency for ringing to occur. The ease with which the device may be disassembled and reassembled facilitates adjustment of the drive pin to individual requirements.

The utilization circuits shown in FIGURES 2 and 3 are by way of example only, it being understood that other utilization circuits such as an AC coupled circuit may be employed, as will be obvious to those versed in the art.

The transducer will indicate the application of either a constant or varying force or pressure, applied to the diaphragm 5. For dynamic pressure measurements, a frequency response of a 95% rise time within 200 microseconds, without ringing or overshoot, can readily be achieved in a practical construction. Conversely, a decrease in the pressure at aperture 8, with respect to the pressure at aperture 23 will result in an output signal of opposite sense. While the invention has been shown and described with respect to a preferred embodiment thereof, it will be understood that such embodiment is but illustrative and various modifications may be made therein without departing from the scope and spirit of the invention. It is, therefore, intended that the appended claims cover all modifications that fall within the spirit and scope of the invention.

What is claimed is:
1. A pressure transducer comprising:
   a circular edged-clamped disc, the central portion of which is deflectable in response to a difference in fluid pressure applied to opposite faces of said disc;
   means for fixedly clamping the periphery of said disc;
   a notched beam cantilevered from said clamping means and having its free end spaced apart from the center of one face of said disc;
   drive means interposed between the center of said disc and said beam for applying a bending moment to the free end of said beam in response to deflection of said central portion of said disc; and
   a semiconductor piezoresistive element secured to said beam across said notch for providing an electrical signal proportional to said difference in fluid pressure.

2. A pressure transducer as defined in claim 1 wherein said clamping means includes:
   a hollow cylindrical body interposed between a circular cover and a circular cap, said cover being provided with a first opening admitting fluid pressure to one face of said disc, and said cap being provided with a second opening admitting fluid pressure to the other face of said disc.

3. A pressure transducer as defined in claim 1 wherein said drive means comprises:
   an elongated drive pin having a first end secured to said free end of said beam for movement therewith and having a second free end adjacent the center of said one face of said disc for movement therewith.

4. A pressure transducer as defined in claim 1 wherein said piezoresistive element comprises an elongated chip of p-type silicon, one end of said chip being secured to the upper edge of one wall of said notch and the other end of said chip being secured to the upper edge of the other wall of said notch, whereby a strain is imparted to said chip in response to a bending moment applied to said cantilever beam.

5. A pressure transducer as defined in claim 4 wherein said beam is provided with first and second electrical conductors extending from opposite sides of said notch and connected to respective ones of the ends of said chip.

6. A pressure transducer as defined in claim 5 wherein said first conductor is connected to said cylindrical body and including:
   an output terminal; and
   means for connecting said second conductor to said output terminal.

7. A pressure transducer comprising:
   a flat circular pressure-responsive diaphragm;
   a hollow cylindrical body having an interior flange portion adjacent a first end thereof and a coaxial interior threaded portion adjacent the opposite end thereof;
   means urging said diaphragm against said first end of said body;
   a first insulator ring coaxially disposed within said body adjacent the interior wall thereof;
   a conductor ring coaxially disposed within said first insulator ring and in abutment therewith;
   a second insulator ring having its outer periphery in abutment with the interior wall of said body, and its upper surface abutting said conductor ring and said insulator ring, thereby electrically insulating said conductor ring from said body;

a locking ring threadedly engaging said threaded portion of said body and urging said second insulator ring against said conductor ring and said second insulator ring;

a notched cantilever beam having its fixed end clamped between said flange portion and said conductor ring, and its free end spaced apart from the center of said diaphragm;

drive means interposed between the center of said diaphragm and the free end of said beam for applying a bending moment to said beam in response to deflection of said diaphragm;

a semiconductor piezoresistive element secured to said beam and bridging the notch therein for providing a change in resistance proportional to deflection of said diaphragm;

a first electrical conductor extending from one end of said piezoresistive element to said flange portion of said body; and, a second electrical conductor extending from the other end of said piezoresistive element to said conductor ring.

8. A pressure transducer as defined in claim 7 including:

a circular cover having a central aperture therethrough coaxially disposed with respect to said body and having a flanged portion in abutment with the peripheral surface of said diaphragm.

9. A pressure transducer as defined in claim 7 including a cylindrical cap secured to said opposite end of said body and having a fluid pressure opening therein.

10. A pressure transducer as defined in claim 7 wherein said drive means comprises:

an elongated drive pin having a first end secured to the free end of said beam for movement therewith, and having a second free end frictionally engaging the center of said diaphragm.

References Cited

UNITED STATES PATENTS

| | | |
|---|---|---|
| 3,327,270 | 6/1967 | Garrison. |
| 3,351,880 | 11/1967 | Wilner. |
| 3,363,456 | 1/1968 | Laimins. |
| 3,389,362 | 6/1968 | McLellan. |
| 3,411,361 | 11/1968 | McLellan. |

REUBEN EPSTEIN, Primary Examiner

U.S. Cl. X.R.

73—398